United States Patent [19]

Sharp

[11] Patent Number: 4,523,454
[45] Date of Patent: Jun. 18, 1985

[54] EXTERNAL JACKET SYSTEM AS SECONDARY CONTAINMENT FOR STORAGE TANKS

[76] Inventor: Bruce R. Sharp, 4090 Rose Hill Ave., Cincinnati, Ohio 45229

[21] Appl. No.: 544,013

[22] Filed: Oct. 21, 1983

[51] Int. Cl.³ .............................................. G01M 3/32
[52] U.S. Cl. ..................................... 73/49.2; 220/449
[58] Field of Search ............ 73/49.2, 49.3, 40, 40.5 R, 73/40.7; 340/605; 220/449

[56] References Cited

U.S. PATENT DOCUMENTS

| | | | |
|---|---|---|---|
| 3,280,620 | 10/1966 | Anderson | 73/40.5 |
| 3,299,417 | 1/1967 | Sibthorpe | 340/242 |
| 3,531,264 | 9/1970 | Greipel | 48/193 |
| 3,830,290 | 8/1974 | Thomasett et al. | 165/70 |
| 4,450,711 | 5/1984 | Claude | 73/40.5 R |

FOREIGN PATENT DOCUMENTS

| | | | |
|---|---|---|---|
| 1150248 | 6/1963 | Fed. Rep. of Germany | 73/49.2 |
| 1194209 | 6/1965 | Fed. Rep. of Germany | 73/49.2 |
| 2854016 | 7/1980 | Fed. Rep. of Germany | 138/104 |
| 135689 | 11/1978 | Japan | 138/104 |
| 2023296 | 12/1979 | United Kingdom | 138/104 |

OTHER PUBLICATIONS

"Haz–Bag & Haz–Sleeve Wrap Up Tanks, Lines," *Petroleum Marketeer*, May–Jun. 1984.

Primary Examiner—Stewart J. Levy
Assistant Examiner—Joseph W. Roskos
Attorney, Agent, or Firm—Charles R. Wilson

[57] ABSTRACT

A storage tank system especially useful for storing liquid gasoline comprises a rigid inner tank encased by a flexible outer jacket with a leak detecting means associated with the closed space between the inner tank and jacket. The system results in a storage facility which is less likely to lose its stored liquid to the environment due to a slow leak or a sudden large leak such as is possible with an earthquake.

21 Claims, 6 Drawing Figures

EXTERNAL JACKET SYSTEM AS SECONDARY CONTAINMENT FOR STORAGE TANKS

This invention relates to liquid storage tank systems. More particularily the invention relates to storage tank systems having improved leak prevention means and leak detection means.

BACKGROUND OF THE INVENTION

Storage tanks are used throughout the world for storing various liquids in bulk form. In particular, storage tanks are used extensively for the storage of liquid gasoline at retail gasoline stations. Necessarily, these stations are in populated areas and therefore there is always a danger associated with leaks from the tanks. Leaked gasoline poses a hazard to the environment as well as an obvious health hazard. The known problem is particularily troublesome in that gasoline storage tanks are usually buried underground and any leaks which develop are normally very slow initially. This means that any leak which does start is difficult to detect until a substantial amount of gasoline has leaked. By that time environmental damage and possible health problems have occurred. The time and expense needed to clean up a gasoline spill can be enormous. It could involve initially emptying the storage tank and removing the emptied tank from the ground. The ground surrounding the tank would have to be decontaminated, a procedure which could be extensive in case of a slow leak which is not detected early or a sudden large leak. In addition to the expense of the above clean-up, there is the loss of profits due to the down-time involved not only with the damaged tank but also possibly the whole gasoline station. The health hazards associated with a gasoline spill can also be enormous in case of an accidental fire or drinking water contamination.

Underground storage tanks are particularly troublesome in those areas that are prone to earthquakes. Typical underground storage tanks are constructed of metal or fiberglass. Any earthquake is likely to cause a crack in the tank with a consequent leak. If the leak is slow, the same problems as above discussed exists. If the leak results in a large sudden loss, the problem is readily detected but only after it is too late.

The problems associated with the present underground storage tanks are well known. Various attempts have been made to alleviate the problems. Several different types of leak detectors are presently being marketed in order to detect even slow leaks. A reliable leak detector would be of some value in that a leak which is detected early enough can be corrected. This may involve the emptying of the tank under controlled conditions and the repair of the tank. Such an operation would be expensive, however it would solve the problem. Another attempt to solve the known problems has been the use of vault systems. In a vault system, the rigid storage tank is surrounded by another rigid tank or shell which acts as an containment vessel if the storage tank developes a leak. A slow leak in the storage tank is satisfactorily contained. However, in those areas prone to earthquakes, it is quite possible the storage tank and the outer rigid tank or shell would both be damaged.

There has now been discovered a liquid tank storage system which solves many of the problems inherent with the existing systems. The system of this invention is economical and provides a measure of protection in earthquake-prone areas not available previously.

SUMMARY OF THE INVENTION

The present invention is concerned with liquid storage tanks. The new system comprises (1) a rigid inner tank having a fill pipe, dispensing line and, optionally, vent pipe (2) a flexible jacket encasing the inner tank and (3) detection means associated with the space between the inner tank and the flexible jacket for detecting leakage. Any leak which occurs in the inner tank is contained within the outer jacket and is detected by the detection means.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention. However, the invention lends itself particularly well to underground tanks used for storing liquid gasoline and, therefore this preferred use is described in the following paragraphs.

Figure 1:
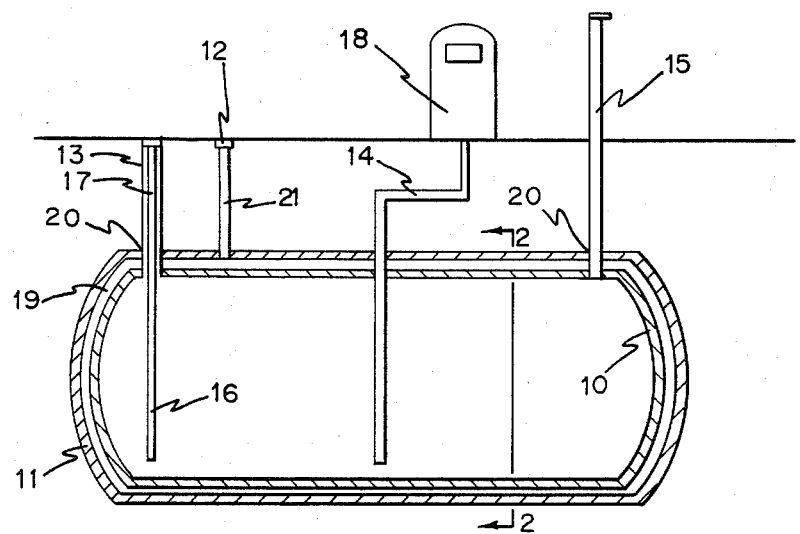
FIG. 1 is a side view, partially in section, of the improved liquid storage tank system.

With reference to FIG. 1 the present invention comprises a rigid inner tank 10, a flexible jacket 11 encasing the inner tank 10, and detection means 12 associated with the space between the inner tank 10 and outer jacket 11. The rigid inner tank is made of metal such as steel or a resin reinforced fiberglass material. Such tanks are well know and are commonly used for storage of various liquids. Connected to the inner tank 10 are a fill pipe 13 communicating with the ground surface, dispensing line 14 for withdrawing gasoline and vent pipe 15.

The fill pipe 13 provides as its obvious function the means by which gasoline can be pumped into the inner tank from an outside source, e.g. a tank truck. As illustrated in FIG. 1 fill pipe 13 comprises a line 16 through which gasoline flows to the inner tank 10 and a space 17 within the fill pipe which acts as a vapor recovery line. As gasoline is pumped into the inner tank, gasoline vapors which are formed are sucked through the space 17 back to the tank truck for recovery. This reduces the amount of gasoline vapors which would otherwise be vented to the atmosphere or remain in the inner tank preventing the tank from being filled completely with gasoline. As used throughout here the term "fill pipe" connotes the pipe by which gasoline is pumped to the tank; it can be a single pipe, but more often has vapor recovery means associated with it and is often referred to as a vapor recovery fill line. As shown in FIG. 1 line 16 extends into the inner tank 11 with its end near the bottom.

Dispensing line 14 is used for withdrawing gasoline and delivering it to the consumer through gasoline dispenser 18. While not illustrated in FIG. 1, a pump is positioned within the inner tank, dispensing line or gasoline dispenser for pumping gasoline to the dispenser. The bottom of the dispensing line 14 is in close proximity with the bottom of the inner tank 10. The vent pipe 15 is optional, though preferred, and merely provides means by which gasoline vapors resulting primarily from a filling operation can be vented to the atmosphere. The opening to the atmosphere is normally substantially off ground level for safety reasons. All the aforementioned pipes and lines are securely attached to the rigid inner tank by known means.

Jacket 11 is constructed of a flexible material of sufficient strength to contain the gasoline in case of a leak. The jacket can be made of an elastomeric material such as rubber, e.g. Buta-n, neoprene, fluoroelastomer, e.g. Viton, polyester, polyethylene, polypropylene, polyvinylchloride, polyurethane, fabric and vinyl backed sheets of any of the foregoing materials as well as materials constructed of two or more of the foregoing materials, e.g. fluoroelastomer coated polyethylene. The listed materials used in construction of the jacket are not all inclusive, but only illustrative of some of the materials that can be used. Preferably, the jacket is made of at least one material which is gasoline impervious. The shape of the jacket 11 is such that it encases the rigid inner tank 10 to form a closed space 19 between said jacket and the inner tank. Preferably the jacket is sized to hold up to 200% of the inner tank's contents.

The jacket is provided with openings 20 for allowing the fill pipe 13, dispensing line 14 and vent pipe 15 to pass therethrough. The method by which the pipes and dispensing line are attached to the jacket is not important to the invention herein. Thus, any means suitable for providing a sealed connection can be used.

The space between the inner tank 10 and the jacket 11 is closed and in communication with leak detection means 12. The detection means shown in FIG. 1 comprises a detecting fluid which completely fills the closed space and extends into standpipe 21 and a sight glass associated with the standpipe to allow for easy observation of the fluid. Thus any leak in the inner tank will cause a migration of detecting fluid into the tank or, less likely, gasoline into the closed space. A loss of fluid into the tank will result in a drop of the level of fluid in the standpipe. Migration of gasoline into the closed space is also detected by observation. For this purpose, the detecting fluid can be dyed a contrasting color for easier observation. The sight glass is shown in FIG. 1 as being at ground level; it will be appreciated the sight glass can just as easily be at a more convenient location, such as in the gasoline station. In colder climates the detecting fluid must be freeze-proof. Thus the fluid must have a freezing point below that normally experienced or, if water (the preferred detecting fluid) have a sufficient quantity of anti-freeze added to it. Alternatively, the detecting fluid can fill the space between the inner tank and outer jacket, but not extend above the freeze line in the standpipe. Sufficient air pressure or vacuum can be used in the space above the detecting fluid and means for detecting a change in pressure can be used for warning of a leak. A vacuum is preferred in the space above the detecting fluid.

Figure 3:
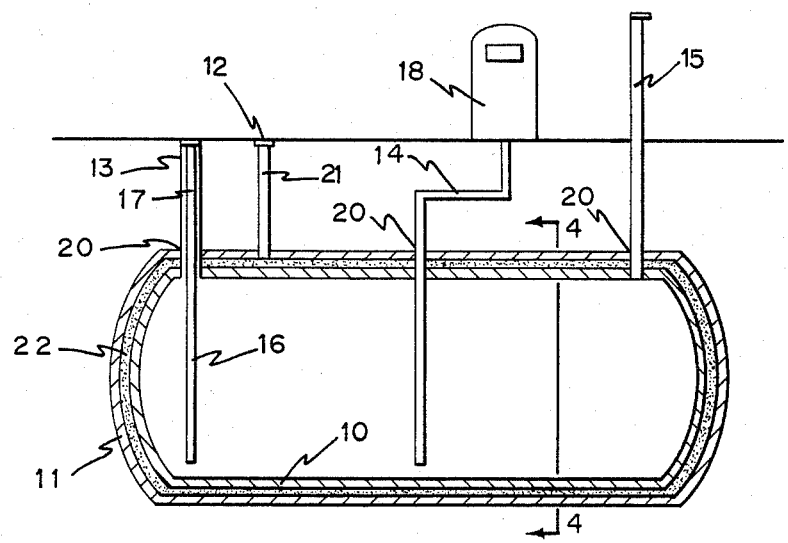
FIG. 3 is a side view, partially in section, of a preferred embodiment of the invention showing a pressure or vacuum leak detection means useful in this invention.
Figure 4:
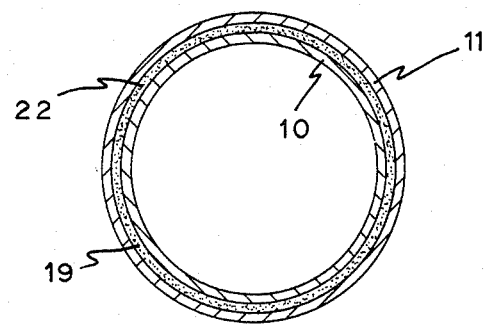
FIG. 4 is a cross-section view taken along lines 4—4 of FIG. 3.

FIGS. 3 and 4 illustrate an alternative leak detection means wherein either a positive or negative pressure is maintained throughout the closed space. Detection means associated with the closed space between the inner tank 10 and jacket 11 is capable of detecting any change in pressure resulting from a leak in the jacket or inner tank. Conventional air pressure or a vacuum means is used for providing the positive or negative pressure. Generally, the use of air pressure is not preferred because the flexible jacket may be gas permeable to a certain degree and loss of pressure because of this must be compensated for. When a vacuum is used, reinforcing means 22 are used to maintain a spaced relationship between the tank and flexible jacket. A gas pervious material, for example a continuous foraminous or porous matting can be placed within the space to maintain the spaced relationship. Jute, polyurethane foam, fiberglass matting, cotton matting, nylon matting and asbestos are examples of materials which can be used. Alternatively, a gas analyzer can be used as a part of the detection means in place of the pressure change detector above discussed.

Figure 2:
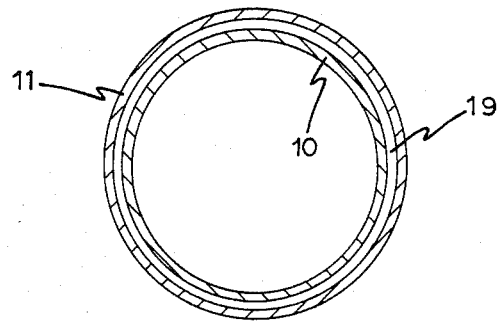
FIG. 2 is a cross-section view taken along lines 2—2 of FIG. 1.
Figure 5:
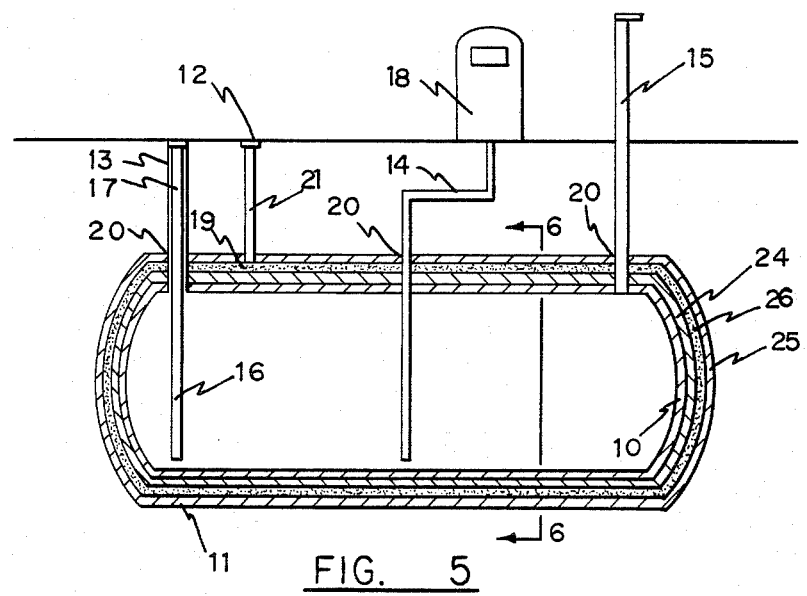
FIG. 5 is a side view, partially in section, of another preferred embodiment of the invention using a double walled jacket as a part of the liquid storage tank system.
Figure 6:
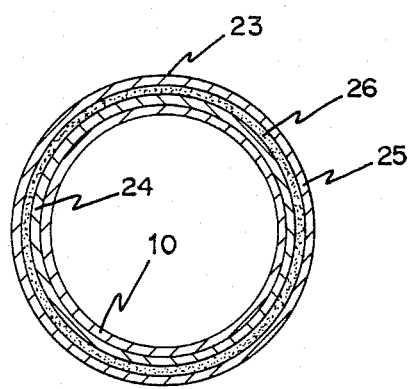
FIG. 6 is a cross-section view taken along lines 6—6 of FIG. 5.

A preferred embodiment of the invention is illustrated in FIG. 5 and FIG. 6. In this storage tank system the rigid outer tank shell 10 is encased by a double walled jacket 23. The double walled jacket 23, best shown in FIG. 6, is comprised of an inner jacket 24 and an outer jacket 25. Means 26 are optionally positioned between the two jackets to maintain a spaced relationship, depending on the detection means used. Detection means 12 is associated with the space between the two jackets. When a detecting fluid, such as described with FIGS. 1 and 2, is used, means are not needed to maintain a spaced relationship. The detection means 12 in this situation is as described above with respect to FIGS. 1 and 2. Alternatively, the space between the two jackets could be maintained under a positive or negative pressure as described above and the detection means 12 in such a situation must be capable of detecting a change in pressure or the presence of gasoline vapors. When a vacuum is used, means 26 are used to maintain a spaced relationship between the two jackets. The jackets are fabricated from the same material described above. Each jacket can be of the same material or each be constructed of a different material. When used, the spacing means 26 is a gas pervious material (as described above) which will keep the two jackets apart, but will also permit a gas to be drawn through it. If the inner rigid tank 10 and inner jacket 24 each develope a leak, gasoline will be detected and confined by outer jacket 25. Fill line 13 dispensing line 14, vent pipe 15 and gasoline dispenser 16 together with openings 20 in the jackets function the same as discussed previously with respect to FIG. 1.

The advantage of the double jacket embodiment of the invention is that it provides another measure of protection against gasoline leakage. Thus the inner jacket 24 provides a first means of confining a leak while the outer jacket 25 provides the second means of confinement.

In a preferred embodiment alarm means are associated with the leak detection means to alert an attendant to any leaking. Any alarm means which can be set off by a fluid level change, pressure change, or gasoline vapor presence can be used.

Still another embodiment of the invention uses at least one additional flexible jacket to encase the fill pipe 13 and/or dispensing line 14. This additional jacket can be an extension of the jacket encasing the inner tank or is independent thereof. The material and mode of operation above described for the jacket encasing the inner tank applies as well to the encasing the fill pipe and/or dispensing line.

In operation, the inner tank is filled with gasoline in normal fashion. Any leakage in the tank will cause a change in level or color of detecting fluid when detecting fluid fills the closed space or a change of pressure when a positive or negative pressure is used in the closed space. Preferably, alarm means will alert an attendant to the problem so that immediate corrective action can be taken. When fluid detection means are used a small leak will cause some contamination either of the gasoline itself by the detecting fluid or contamination of the detecting fluid depending on the direction of migration. A large leak in the inner tank such as could be caused by an earthquake will result in a substantial mixing of gasoline and detecting fluid; however, the flexible nature of the jacket will withstand the sudden stress caused by the earthquake and confine the leaked gasoline. Subsequent clean-up can occur as time permits without concern for the safety of the environment or the health of residents.

What is claimed is:

1. An underground storage tank system for liquids having secondary containment capability and leakage detection capability utilizing detecting fluid, comprising:
    (a) a rigid inner tank for storing the liquid, having fill pipe and dispensing line;
    (b) a flexible jacket encasing the inner tank so as to form a closed space between the tank and the jacket; and
    (c) detecting means associated with the closed space between the inner tank and the flexible jacket for detecting leakage into or from either of said tank and jacket wherein the detecting means comprises a standpipe which extends from the flexible jacket to a point of observation and detecting fluid which fills the space between the tank and jacket such that any change in the level or color of the fluid occupying the closed space is readily observed through a sight glass associated with the standpipe.

2. The storage tank system of claim 1 wherein the flexible jacket is made of an elastomeric material.

3. The storage tank system of claim 2 wherein the elastomeric material is a gasoline impervious material.

4. The storage tank system of claim 1 further comprising at least one additional flexible jacket encasing one or more pipes which communicate with the tank and additionally having detecting means associated with the additional flexible jacket so as to detect any leakage in the encased pipe.

5. The storage tank system of claim 1 wherein the inner tank is used for the storage of gasoline.

6. The storage tank system of claim 1 wherein the detecting fluid is water.

7. The storage tank system of claim 6 wherein the detecting fluid fills the space between the tank and the jacket but does not extend above the freeze line in the standpipe and the space above the detecting fluid is maintained under either positive or negative pressure with means for detecting any change in the pressure such that the pressure change is used for warning of a leak instead of the observation of any detecting fluid change.

8. An underground storage tank system for liquids having secondary containment capability and leakage detection capability utilizing positive air pressure, comprising:
    (a) a rigid inner tank for storing the liquid, having fill pipe and dispensing line;
    (b) a flexible jacket encasing the inner tank so as to form a closed space between the tank and the jacket; and
    (c) detecting means associated with the closed space between the inner tank and the flexible jacket for detecting leakage into or from either of said tank and jacket comprising air pressure means to maintain a positive pressure in the closed space and means capable of detecting any change in pressure in the closed space.

9. The storage tank system of claim 8 wherein the flexible jacket is made of an elastomeric material.

10. An underground storage tank system for liquids having secondary containment capability and leakage detection capability utilizing negative air pressure and spacing means, comprising:
    (a) a rigid inner tank for storing the liquid, having fill pipe and dispensing line;
    (b) a flexible jacket encasing the inner tank so as to form a closed space between the tank and the jacket; and
    (c) detecting means associated with the closed space between the inner tank and the flexible jacket for detecting leakage into or from either of said tank and jacket comprising gas pervious means positioned in the closed space to maintain a spaced relationship between the tank and flexible jacket, vacuum means to maintain a negative pressure in the closed space, and means capable of detecting any change in pressure in the closed space.

11. The storage tank system of claim 10 wherein the flexible jacket is made of an elastomeric material.

12. The storage tank system of claim 11 wherein the gas pervious means is jute, polyurethane foam, fiberglass matting, cotton matting, nylon matting or asbestos.

13. A double walled jacketed underground storage tank system for liquids having two means of confining a leak, comprising:
    (a) a rigid inner tank for storing the liquid, having fill pipe and dispensing line;
    (b) an inner flexible jacket encasing the inner tank;
    (c) an outer flexible jacket encasing the inner flexible jacket so as to form a closed space between the two jackets; and
    (d) detecting means associated with the closed space for detecting leakage into or from either of said tank and jackets.

14. The storage tank system of claim 13 wherein a detecting fluid is found in the closed space.

15. The storage tank system of claim 14 wherein air pressure or vacuum is maintained in the space above the detecting fluid.

16. The storage tank system of claim 13 wherein the space between the two jackets is maintained under either a positive or negative pressure.

17. The storage tank system of claim 16 wherein a vacuum is maintained in the closed space and gas pervious means are used for maintaining a spaced relationship between the two jackets.

18. The storage tank system of claim 17 wherein the gas pervious means is jute, polyurethane foam, fiberglass matting, cotton matting, nylon matting or asbestos.

19. The storage tank system of claim 13 wherein the inner tank is used for the storage of gasoline.

20. The storage tank system of claim 13 wherein the flexible jackets are made of elastomeric material.

21. The storage tank system of claim 20 wherein the elastomeric material is a gasoline impervious material.

* * * * *